United States Patent [19]

Friedli et al.

[11] 4,434,466

[45] Feb. 28, 1984

[54] APPARATUS FOR CONTROLLING THE ACCESS OF PROCESSORS AT A DATA LINE

[75] Inventors: Paul Friedli, Zurich; Hans G. Süss, Udligenswil, both of Switzerland

[73] Assignee: Inventio AG, Hergiswil, Switzerland

[21] Appl. No.: 310,589

[22] Filed: Oct. 13, 1981

[30] Foreign Application Priority Data

Oct. 20, 1980 [CH] Switzerland ............... 7797/80

[51] Int. Cl.³ ............................................. G06F 15/00
[52] U.S. Cl. ......................................................... 364/200
[58] Field of Search ............................... 364/200, 900

[56] References Cited

U.S. PATENT DOCUMENTS

| | | | |
|---|---|---|---|
| 3,699,529 | 10/1972 | Beyers et al. | 364/200 |
| 4,038,644 | 7/1977 | Duke et al. | 364/900 |
| 4,137,565 | 1/1979 | Mager et al. | 364/200 |
| 4,223,380 | 9/1980 | Antonaccio et al. | 364/200 |

*Primary Examiner*—Gareth D. Shaw
*Assistant Examiner*—Ronni S. Malamud
*Attorney, Agent, or Firm*—Werner W. Kleeman

[57] ABSTRACT

An apparatus for controlling the access of a plurality of microprocessors at a data line. The microprocessors are connected by interface components or blocks, logic switching circuits and bus drivers with two lines or conductors. An access request or demand of a processor initiates a signal change at the first line. This signal change causes the transformation of data which is specific to the processor into a delay or a priority signal, upon the occurrence of which there is accomplished a signal change of the second line. As a function thereof there appears at an input of the interface component a signal change which is indicative of the availability of the data line. Upon simultaneous occurrence of access requests or demands of a number of processors the signal change of the second line is brought about by that processor whose priority signal possesses the smallest delay. The signal change of the second line prevents the occurrence of the priority signals possessing the greater time-delays and which are correlated to the remaining processors. At these processors there thus cannot occur any signal change at the input of the related interface component or block and which indicates the availability of the data line.

4 Claims, 4 Drawing Figures

APPARATUS FOR CONTROLLING THE ACCESS OF PROCESSORS AT A DATA LINE

CROSS REFERENCE TO RELATED APPLICATION

This application is related to the commonly assigned U.S. Application Ser. No. 06l/312,659 filed Oct. 19, 1981, entitled "Multiprocessor System".

BACKGROUND OF THE INVENTION

The present invention relates to a new and improved construction of apparatus for controlling the access of microprocessors or processors at a data line.

Generally speaking, the arrangement of the present development is of the type wherein the processors are connected by means of input-output interface components at the data line and each input-output interface component has an input which reads an access requirement or requisition of a processor.

With such type apparatuses it is possible to accomplish by means of standardized commercially available input-output interface components data transfer to a data line between a digital computer and an external component or unit, for instance a teleprinter through the use of serial transmission techniques. Before the data transfer there is clarified, by means of a sequence of control signals, the transmitting and receiving preparedness between the individual terminals. However, if a data exchange is to be accomplished between a number of computer systems or processors, as the case may be, connected with a common data line or between such computer systems or processors and with external components connected with the common data line, then problems arise particularly when encountering simultaneous access to the data line. These problems cannot be readily resolved through the use of standardized input and output components.

With an apparatus of the type disclosed in the German Patent Publication No. 2,824,557 which serves for the direct coupling of a plurality of microprocessors to a common system bus there is proposed a solution to the existing problem. In that prior art system the microprocessors which possess a HOLD-input and a HOLDA-output are provided with a logic device by means of which there can be controlled the access to the system bus. Before the access is released there must be accomplished a bus-requisition or demand cycle in the form of a signal sequence which essentially consists of a requisition or demand signal BUSREQ at a processor which functions as a master and a receipt signal HOLDA of such master at the requistioner or demander. Only when there is present a receipt is it possible for the requisitioner or demander to occupy the bus for one or a number of access operations. In order to accomplish the bus requisition cycle the microprocessors are connected together in accordance with the master-slave principle such that the requisition or demand outputs BUSREQ of the slave processors are coupled by means of an OR-gate with the HOLD-input of the master processor and its receipt output HOLDA is coupled with a receipt input BPRI of the next following slave processor. The slave processors are mutually coupled with one another in such a fashion that in each instance a receipt output BPRO of a preceding slave processor is connected with a receipt input BPRI of a subsequent slave processor.

With this equipment there is determined the priority of the individual microprocessors, so that with simultaneous access of a plurality of microprocessor it is possible in each case for that processor to have access to the bus which is situated closest to the master processor. However, the drawbacks of such state-of-the-art equipment reside in the fact that in addition to the data and control lines of the system bus there are further required additional lines for the accomplishment of the bus-requisition or demand cycle, and with increasing number of microprocessors there also increase the number of requisition or demand lines BUSREQ. What is also disadvantageous with this equipment is that with increasing number of processors the bus allocation becomes much too time-consuming, since the individual processors, during the receipt switching operations, must be sampled in timewise succession in order to ascertain which one of the processors is the requisitioner or demander.

SUMMARY OF THE INVENTION

Therefore, with the foregoing in mind it is a primary object of the present invention to provide a new and improved construction of apparatus for controlling the access of processors to a data line in a manner not afflicted with the aforementioned drawbacks and limitations of the prior art proposals.

Another and more specific object of the present invention aims at providing an apparatus which is improved in relation to the previously described state-of-the-art equipment, serving for controlling the access of microprocessors to a data line, which apparatus requires fewer lines or conductors and by means of which there can be more rapidly determined the access priority.

Now in order to implement these and still further objects of the invention, which will become more readily apparent as the description proceeds, the apparatus for controlling the access of processors at a data line as contemplated by the invention, is manifested by the features that for carrying out the bus-requisition or requirement cycle also referred to as bus request there are used two lines. During a first phase the first line is allocated to that processor which is the first to transmit an access request or requisition, and wherein during a second phase a processor-specific data or information is converted into a time-delay of a priority signal and this signal is introduced to the second line. Hence, with simultaneous arrival or occurrence of access requests of a number of processors the second line has allocated thereto that processor whose priority signal possesses the smallest time-delay, and which thus possesses priority for the access to the data line. During a third phase there is accomplished the actual data transfer.

The advantages which can be realized with the invention essentially reside in the fact that when using serial transmission techniques and a random number of subscribers there are required in toto only three lines or conductors. Specifically, two lines are needed for the control of the bus access and one line for the serial data transfer. An additional advantage is realized in terms of the fact that for the additional logic or logic system needed for the control of the bus access there can be beneficially utilized standardized serial interface components which can be modified and augmented accordingly with relatively modest expenditure in time and effort.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
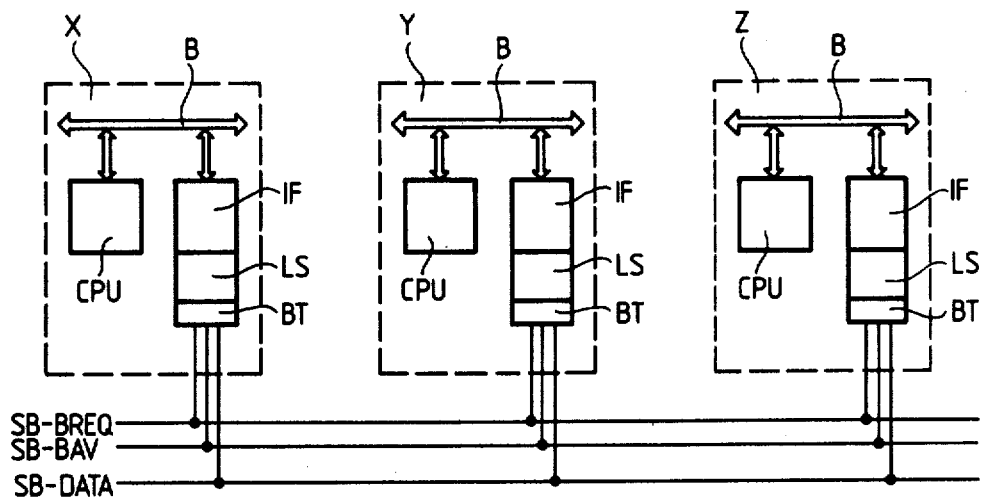
FIG. 1 is a block circuit diagram of an exemplary embodiment of apparatus according to the invention.

Describing now the drawings, in FIG. 1 three mutually independent microcomputer systems have been generally designated by reference characters X, Y and Z. Each of the individual microprocessors CPU of the microcomputer systems X, Y and Z are individually connected in any appropriate manner by means of a related bus B composed of address lines, data lines and control lines, with not here further illustrated read-write memories, also known as random access memories (RAM's), read-only memories (ROM's) and input-output components or blocks which are operatively correlated with the relevant microcomputer system. Each microcomputer system X, Y and Z is connected by a suitable coupling system composed of a serial interface component IF, a logic switching circuit LS and bus drivers BT with a data line SB-DATA as well as with a first line SB-BREQ and a second line SB-BAV serving for the determination of the access priority.

Figure 2:
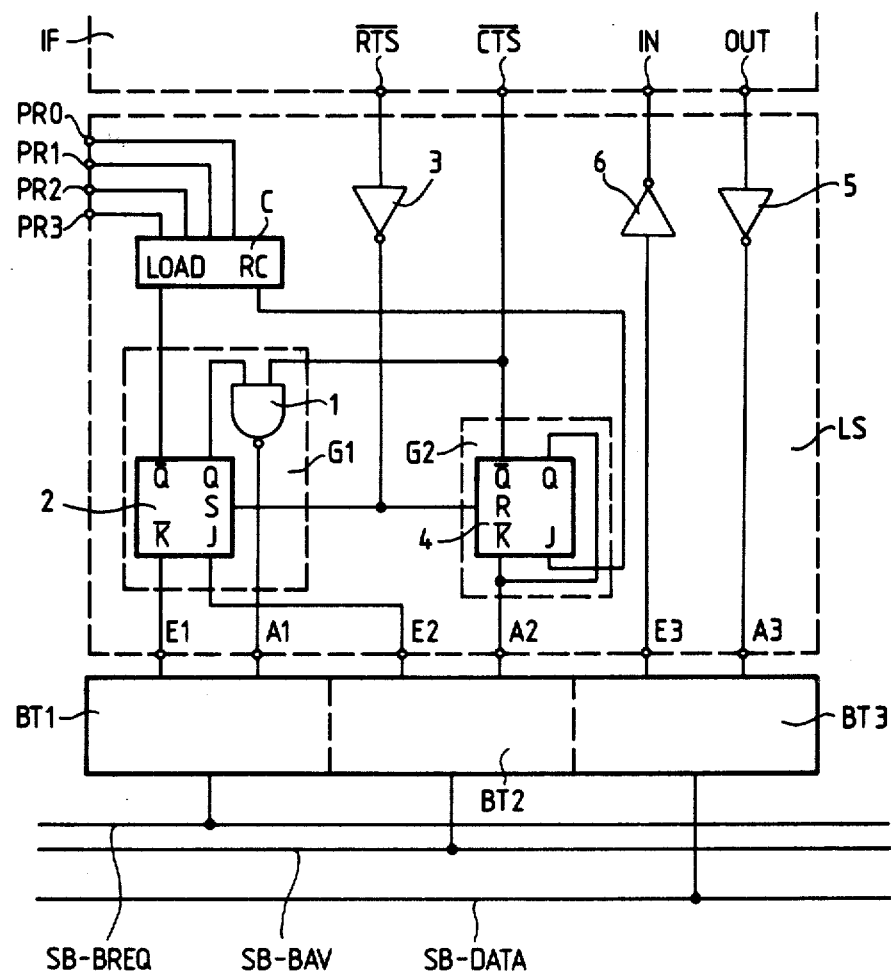
FIG. 2 illustrates in detail a logic switching circuit of the apparatus shown in FIG. 1.

According to the detailed circuit diagram shown in FIG. 2 the logic switching circuit LS possesses a requisition or requirement output A1 coupled by means of a first bus driver BT1 with the first line SB-BREQ, a priority output A2 connected by means of a second bus driver BT2 with the second line SB-BAV, and a data output A3 coupled by means of a third bus driver BT3 with the data line SB-DATA. Reference characters E1, E2 and E3 represent three inputs connected with the bus drivers BT1, BT3 and BT3 and by means of such bus drivers there can be read the signal state or condition of the related line or conductor SB-BREQ, SB-BAV and SB-DATA. A counter C possesses four parallel inputs PR0, PR1, PR2, PR3 which are connected with a not particularly illustrated interface component which is parallelly correlated to the related microcomputer system X, Y and Z, and by means of which there can be loaded a binary number which is representative of the priority of the relevant microprocessor CPU. This binary number is resident in the micrprocessor memory and is processor specific, i.e., each processor coupled to the bus has to have a different priority number. A first gate arrangement G1 consists of a NAND-gate or circit 1 and a JK-flip-flop 2, wherein its inputs K, J are connected with the so-called reading or read inputs E1 and E2, respectively, and its output Q is connected with an input of the NAND-gate 1 and its output Q is connected with an incrementizing connection LOAD of the counter C. The input S of the JK-flip-flop 2 is connected by means of a NOT-gate or circuit 3 with a connection $\overline{RTS}$ of a serial interface component IF, the connection $\overline{RTS}$ delivering an access request BREQ when the related microprocessor wishes to transmit data or have access to the data line SB-DATA. The output of the NAND-gate 1 is connected with the request or requisition output A1 which further transmits the access request or requisition BREQ. A second gate arrangement G2 comprises a further JK-flip-flop 4, the input J of which is connected with a transfer or carry connection RC of the counter C and whose input $\overline{K}$ and output Q are coupled with one another and connected with the priority output A2. The output $\overline{Q}$ of the further JK-flip-flop 4 is connected with an input $\overline{CTS}$ of the serial interface component IF and a further input of the NAND-gate 1, the input $\overline{CTS}$ signalling the availability of the data line SB-DATA, i.e. a signal change at the input CTS' signals the related microprocessor that it can transmit. The input R of the further JK-flip-flop 4 is connected with the input S of the JK-flip-flop 2 of the first gate arrangement G1. The data output A3 and the data input E3 are connected by means of a respective NOT-gate 5 and 6 with a data output OUT and a data input IN of the serial interface component IF.

As a matter of convenience in illustration and to simplify the showing of the drawings there have not been particularly illustrated the terminals and connections needed for introducing the clock signal into the logic switching circuit LS. The bus drivers BT1, BT2 and BT3 as well as the serial interface components are commercially available elements or components, for instance those which can be obtained from Texas Instruments under Type SN 75138 and TMS 9902 respectively.

Figure 3:
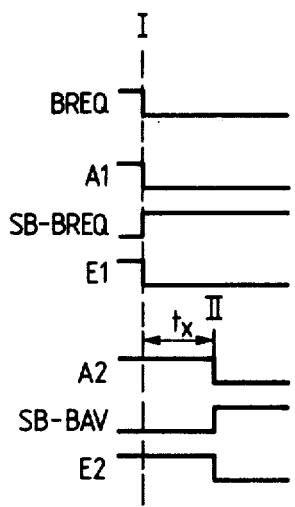
FIG. 3 is a diagram illustrating the timewise course of the signals of the inputs and outputs of the logic switching circuit and the therewith connected lines or conductors during a requisition or requirement cycle, also referred to as a demand cycle.

Having now had the benefit of the foregoing description of the exemplary embodiment of apparatus for controlling the access of processors at a data line, its mode of operation will be considered and is as follows:

During an access of, for instance, the microprocessor CPU of the microprocessor system X at the data line SB-DATA, the related serial interface component IF is controlled and an access request or requisition BREQ, meaning a request signal, is transmitted by means of the connection $\overline{RTS}$ and the first gate arrangement G1 to the request or requisition output A1. If the data line SB-DATA is free, which for instance can be represented by lower potential of the first and second lines SB-BREQ, SB-BAV and high potential of the first and second reading inputs E1 and E2, then by means of the first bus driver BT1 the first line SB-BREQ is set or placed at a high potential and the first reading input E1 of all microcomputer systems X, Y and Z is set or placed at a lower potential. This has been shown in FIG. 3 at the time I. Consequently, by means of the first gate arrangement G1 counter C of the microcomputer system X starts to count-up, starting at the binary number defined by PR0, PR1, PR2, PR3. After a time $t_x$ the counter C has terminated the incrementizing or counting-up operation, and there is thus created an overflow or carry signal RC. By means of this overflow or carry signal and the second gate arrangement G2 the potential of the priority output A2 is placed lower. This has been represented in FIG. 3 at the time II. At the same time the second line SB-BAV is set to a high potential by means of the second bus driver BT2 and, accordingly, all of the reading inputs E2 are placed at a lower potential. With the generation of the overflow or carry signal RC at the counter C of the microcomputer system X there is additionally produced by means of the second gate arrangement G2 at the input $\overline{\text{CTS}}$ of the serial interface component IF a signal change which is indicative of th availability of the data line SB-DATA. At the remaining microcomputer systems Y and Z there cannot occur this signal change, since wih low set reading or read inputs E2 there is not possible any incrementizing or counting of the counter C, and thus, the generation of a transfer or carry i.e. the overflow or carry signal RC. The data of the microcomputer system X now can be transferred serially by means of the data outputs OUT and A3 and is, by way of example and not limitation, composed of one or multi-byte messages which are composed of addresses and data bits. The addressed system or systems appropriately identify the data received by means of the data inputs E3 and IN and transfers such from the serial interface component IF into a read-write memory or random access memory.

Figure 4:
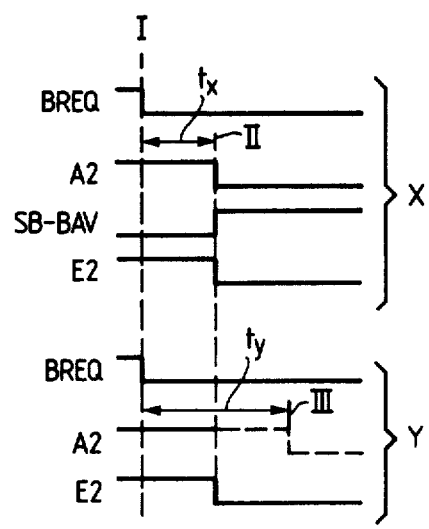
FIG. 4 is a diagram illustrating the timewise course of the signals of the priority inputs and outputs as well as the priority line in the case of two simultaneously occurring access requisitions or requirements.

With simultaneous access, for instance of the microcomputer systems X and Y at the data line SB-DATA, there is simultaneously initiated, as indicated at the time I, FIG. 4, by means of the first gate arrangements G1 the incrementization operation of the related counter C. It is here assumed that the microcomputer system X has priority in relation to the microcomputer systems Y and Z, and the corresponding counter C therefore contains the largest binary number. This counter C therefore first terminates the incrementizing or counting-up operation, while generating a transfer or carry, after the time $t_x$, and the potential of the priority output A2 is set low by means of the second gate arrangement G2 (time II, FIG. 4). At the same time there is placed at a high potential, by means of the second bus driver BT2, the second line SB-BAV and all of the reading inputs E2 are placed at a low potential, so that the incrementizing or counting operation of the counter C of the microcomputer system Y can be terminated prior to setting the RC signal by means of the first gate arrangement G1, and the RC signal can only first then be set after a time $t_y$ (time III, FIG. 4) corresponding to the smaller binary number. When there has not been accomplished the transfer, i.e. with no RC signal there also cannot occur any signal change at the input $\overline{\text{CTS}}$ of the related serial interface component IF which would indicate the availability of the data line SB-DATA.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An apparatus for controlling the access of microprocessors at a data line, comprising:
   a plurality of microprocessors;
   a data line;
   an input-output interface component provided for each microprocessor for connecting each related microprocessor with the data line;
   each input-output interface component reading an access request of its related microprocessor;
   a respective logic switching circuit operatively connected with the input-output interface component of the related microprocessor;
   said logic switching circuit having a request output delivering a signal representative of the access request;
   each said logic switching circuit having a priority counter and a priority output signalling a priority with respect to the access of the related microprocessor;
   a single first line for all of said logic switching circuits;
   a single second line for all of said logic switching circuits;
   a respective first bus driver for each logic switching circuit for connecting the request outputs of each of said logic switching circuits with each single first line;
   a respective second bus driver for each logic switching circuit for connecting the priority outputs of each of said logic switching circuits with said single second line; and
   each said logic switching circuit containing a first reading input coupled with the first bus driver for receiving a signal representative of the signal state of the single first line and a second reading input coupled with the second bus driver for receiving a signal representative of the signal state of the single second line.

2. The apparatus as defined in claim 1, wherein:
   each said logic switching circuit having a data input and a data output;
   a respective third bus driver provided for each said logic switching circuit;
   said data line comprising a line which is connected by said third bus driver with said data input and said data output of the related logic switching circuit;
   each said input-output interface component containing an input and an output and comprising a serial interface component; and
   said data input of each logic switching circuit being connected with said interface input and said data output with said interface output of its related input-output interface component.

3. The apparatus as defined in claim 2, wherein:
   the priority of the related microprocessor is expressed by a binary number of said counter.

4. The apparatus as defined in claim 1, wherein:
   each said logic switching circuit comprises a first gate arrangement;
   each said input-output interface component having an output delivering an access request;
   said first gate arrangement connecting said output of its related serial input-output interface component with the request output of the logic switching circuit;
   said counter of each logic switching circuit having a counter input;
   said first gate arrangement connecting the first reading input of the related logic switching circuit with said counter input of the counter;
   the counter of the related logic switching circuit being counted-up upon occurrence of at least one access request and a resultant signal change of the single first line and the first reading input;
   the counters of the related logic switching circuits being simultaneously counted-up upon simultaneous occurrence of a number of access requests and a resultant signal change of the single first line and the first reading input;

each said logic switching circuit containing a second gate arrangement;

each counter having a carry connection for a carry;

said second gate arrangement connecting the carry connection of the counter with the priority output of the related logic switching circuit;

a signal change of the priority output connected with the counter, the single second line and the second reading input of the related logic switching circuit occurring when there is present a carry of the counter possessing the largest binary number;

said second reading input being connected by means of the first gate arrangement with the counter input of the counter of the related logic switching circuit;

the counting-up of the counter possessing the smaller binary number being interrupted prior to reaching the carry at the carry connection of the counter upon signal change of the second reading input of the related logic switching circuit; and said carry connection of the counter being connected by means of the second gate arrangement with an input of the related input-output interface component and which input signals the availability of the data line.

* * * * *